Figure 4:
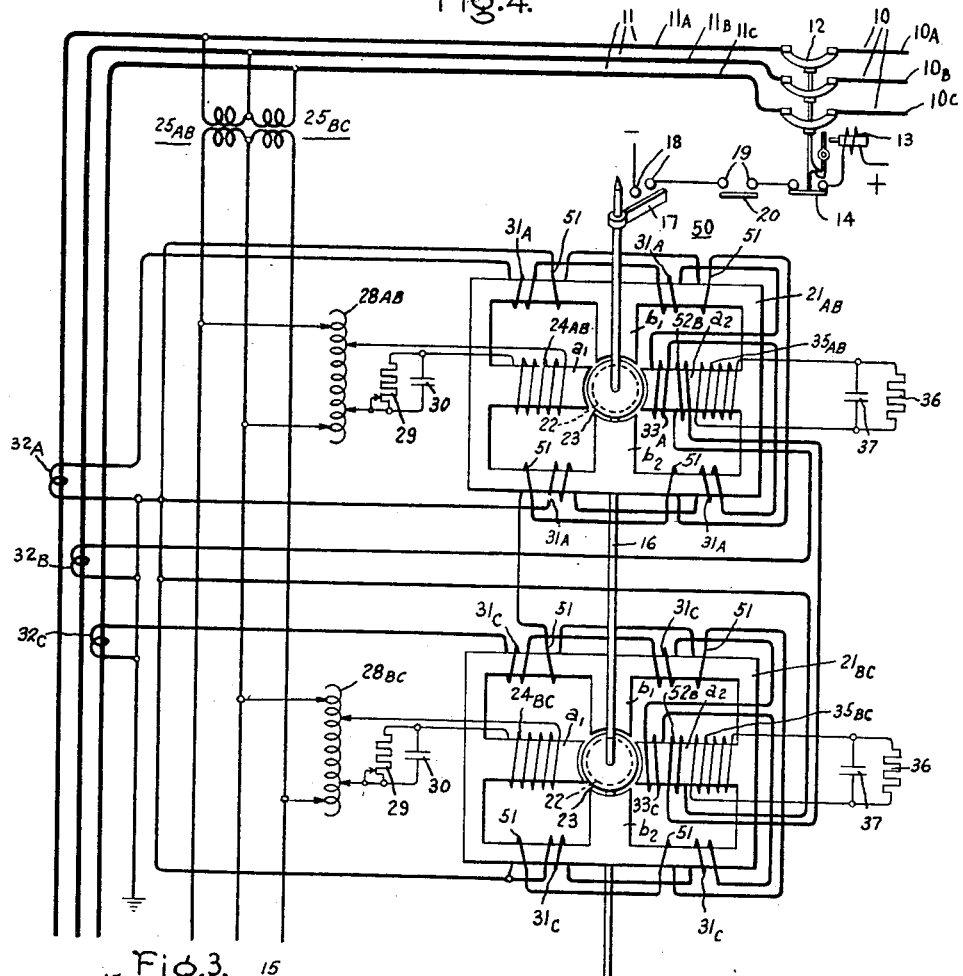

March 28, 1944.  A. R. VAN C. WARRINGTON  2,345,440
PROTECTIVE SYSTEM
Filed Jan. 21, 1941  2 Sheets-Sheet 1
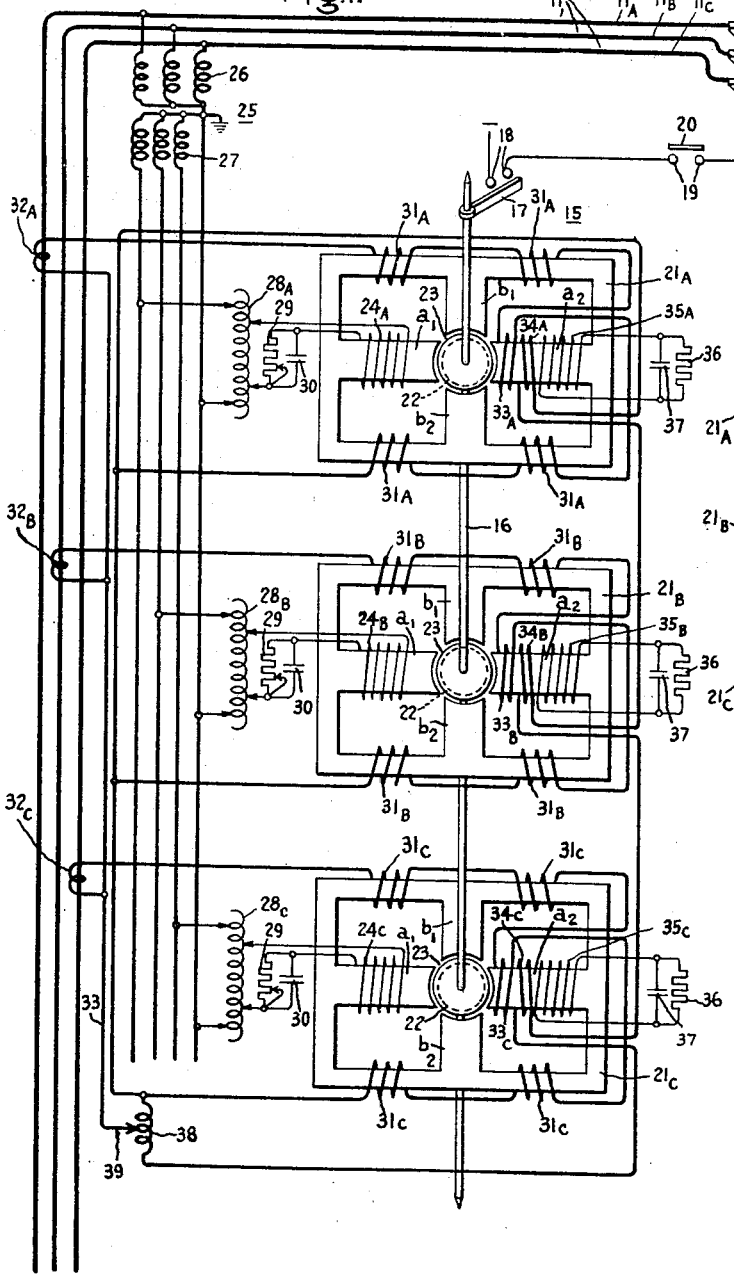
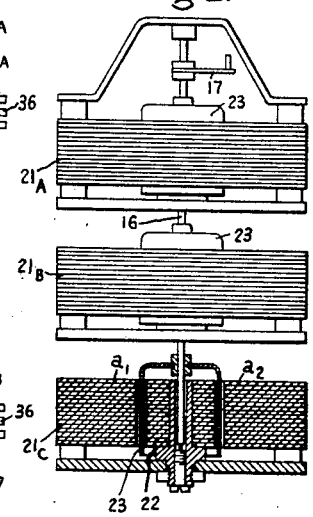
Inventor:
Albert R. van C. Warrington
by Harry E. Dunham
His Attorney.

March 28, 1944.  A. R. VAN C. WARRINGTON  2,345,440
PROTECTIVE SYSTEM
Filed Jan. 21, 1941  2 Sheets-Sheet 2

Inventor:
Albert R. van C. Warrington,
by Harry E. Dunham.
His Attorney.

Patented Mar. 28, 1944

2,345,440

UNITED STATES PATENT OFFICE 2,345,440

PROTECTIVE SYSTEM

Albert R. van C. Warrington, Wallingford, Pa., assignor to General Electric Company, a corporation of New York Application January 21, 1941, Serial No. 375,207

17 Claims. (Cl. 175—294)

My invention relates to protective systems for electric circuits and more particularly to relays of the distance type employed in such protective systems.

Electric circuits, as is well known to those skilled in the art, are subject to several different kinds of faults. A polyphase electric circuit, for example, and more particularly the common three-phase electric circuit, may be subject to phase-to-phase faults, three-phase faults, phase-to-ground faults, or a combined phase-to-phase and ground fault. Distance relays have been provided which protect against phase-to-phase faults, three-phase faults, and double line-to-ground faults on a three-phase system. Such an arrangement is disclosed and claimed in my Patent 2,214,866, granted September 17, 1940, and assigned to the same assignee as the present application.

Similarly, distance relays have been provided for protection against single line-to-ground faults, this latter type of relay involving somewhat different connections due to the different type of fault. Heretofore, when it was desired to provide complete protection against both ground and phase faults for a polyphase system, it was necessary to provide a set of distance relays for ground-fault protection and a set of distance relays for phase-fault protection. This doubles the number of relays and, consequently, considerably increases the cost inasmuch as distance relays which have cooperating current and potential windings are relatively complicated and costly.

In my copending application, Serial No. 375,208, filed January 21, 1941, now Patent 2,315,468, and assigned to the same assignee as the present invention, I have disclosed and claimed a polyphase distance relay in which the current and potential connections are changed in response to certain types of faults whereby the same distance response for all types of faults may be obtained. Such an arrangement operates very satisfactorily and is less expensive than the prior arrangements requiring separate relays for phase and ground faults but the switching means required is still relatively costly and, although as simple as possible, it does add a certain amount of complexity. The ideal situation would be to provide a polyphase distance relay which would not require any switching of the current and potential connections and yet which would protect against all types of faults and operate similarly for all of these faults at a predetermined distance from the relay independently of the number of conductors involved in the fault and whether or not ground faults are involved.

Distance relays generally include some form of a so-called "ohm unit" which may be either of the reactance or impedance type and a power directional unit for preventing operation of the protective circuit breakers unless the fault is on the portion of the system being protected. It has been found possible to produce a polyphase power directional relay comprising a single movable element instead of a separate directional unit for each phase of the system. Such a device is disclosed and claimed in United States Letters Patent 2,110,673, granted March 8, 1938, upon an application of Andrew J. McConnell, and assigned to the same assignee as the present application. Heretofore, however, ohm units for determining the distance response of the distance relay have not been constructed as polyphase units having a single movable element which would give the same distance response for all types of faults. It would be desirable to provide such a polyphase ohm unit having a single movable element for it will enable the use of a single polyphase directional unit and, consequently, is considerably superior in that it has the obvious advantage of less maintenance, panel space, and the like. Furthermore, as contrasted with a plurality of single-phase units such as were commonly used heretofore, there is no risk of false measurement by a unit in a phase other than the faulted phase.

Accordingly, it is an object of my invention to provide a new and improved protective system for an electric circuit employing a distance relay having a polyphase ohm unit including a single movable element which will provide the same distance response regardless of the type of fault that occurs on said circuit.

It is another object of my invention to provide a polyphase ohm unit for a distance relay having a single movable element, which ohm unit will provide the same distance response regardless of the type of fault that occurs on the system associated therewith.

It is another object of my invention to provide a new and improved ohm unit for a distance relay which may be used with a polyphase power directional unit which is simple and rugged in construction, requires a minimum amount of panel space, eliminates all risks of false measurement, and has a much lower cost than the devices for performing similar functions heretofore.

Further objects and advantages of my invention will become apparent as the following description proceeds and the features of novelty which characterize my invention will be pointed out with particularity in the claims annexed to and forming a part of this specification.

Figure 3:
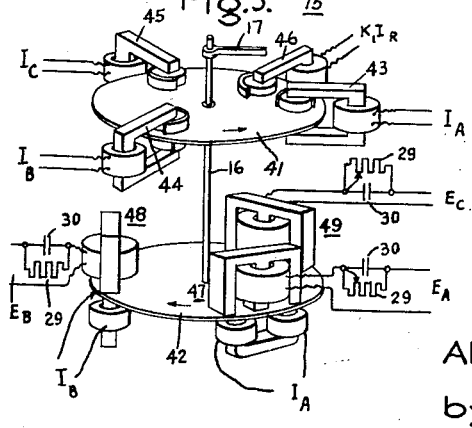

For a better understanding of my invention, reference may be had to the accompanying drawings in which Fig. 1 is a schematic diagram illustrating one embodiment of my invention, Fig. 2 is a sectional view showing the structural details of the polyphase ohm unit schematically shown in Fig. 1, Fig. 3 is a schematic diagram of a modified arrangement of the embodiment of Fig. 1 to aid in understanding my invention, and Fig. 4 represents a modification of my invention.

Although distance relays are generally classified under two types, namely, the impedance relay and the reactance relay, I have preferred to illustrate my invention specifically as applied to reactance relays although much of the theory included hereinafter applies equally well to both types. The single-phase reactance relay and particularly the ohm unit thereof usually comprises a movable element upon which two opposed torques are applied, one an operating torque proportional respectively to the square of the fault current and the other a restraining torque proportional to the reactive volt amperes of the faulted circuit, which may be mathematically designated as $I^2$ and $EI \sin \phi$, respectively, where $\phi$ is the angle between $E$ and $I$ or the power-factor angle of the faulty circuit assuming negligible fault resistance. In a reactance relay, the ratio $$\frac{EI \sin \phi}{I^2} = Z \sin \phi = X$$

the reactance of the circuit for the distance to which the relay will reach.

I have discovered that a polyphase ohm unit having a single movable element can be constructed which will have the same distance response for all faults regardless of the number of conductors involved or whether a ground fault is involved if the operating torque applied to the movable element is made proportional to $$(I_1')^2 + (I_2')^2 + \frac{(I_0')^2 Z_0'}{Z_1'}$$

where $I_1'$, $I_2'$, and $I_0'$ are the magnitudes of the positive, negative, and zero-phase-sequence currents, respectively, flowing in the circuit at the relay a variable distance from the fault, depending upon the location of the latter, and $Z_0'$ and $Z_1'$ are the zero-phase-sequence impedance and the positive-phase-sequence impedance, respectively, between the relay and the fault, and the restraining torque applied to the single movable element is made proportional to $$V_1' I_1' \sin \phi_1 + V_2' I_2' \sin \phi_2 + V_0' I_0' \sin \phi_0$$

in the case of a reactance relay, where $V_1'$, $V_2'$, and $V_0'$ are the magnitudes of the positive, negative, and zero-phase-sequence voltages at the relay, and $\phi_1$, $\phi_2$, and $\phi_0$, respectively, are the angles between the positive, negative, and zero-phase-sequence currents and voltages. In other words, I have found that, in certain electric circuits as will be described in greater detail hereinafter, $$\frac{V_1' I_1' \sin \phi_1 + V_2' I_2' \sin \phi_2 + V_0' I_0' \sin \phi_0}{(I_1')^2 + (I_2')^2 + \frac{(I_0')^2 Z_0'}{Z_1'}} =$$

$$Z_1' \sin \phi = X_1' \quad (1)$$

for a reactance relay for any type of fault which might exist on the circuit, where $X_1'$ is the positive-phase-sequence reactance between the relay and the fault.

The proof of Equation 1 above for all of the different types of faults which might occur on a three-phase alternating-current circuit, such as a transmission line, is included in Tables I to IV below. In Table I, I have tabulated the positive, negative, and zero-phase-sequence currents and voltages at the fault on a three-phase circuit, such as a power transmission line, for the four different types of faults which might occur thereon, i. e., three phase, line to line, line to ground, and double line to ground. In short circuit calculations it is customary to assume all generated electromotive forces of equal magnitude and in phase with each other. Also when the alternating current system under consideration is expressed in equivalent phase sequence networks it is assumed that these networks all have substantially the same power factor. These assumptions have been made in the calculations set forth in this specification in order to greatly simplify the expressions so that all the terms may be expressed by scalar quantities. The error in relay measurement in cases where these assumptions are not true imposes certain limits in the application of the protective system of my invention, but as pointed out in more detail hereinafter, the protective system of my invention would be applicable in many situations.

TABLE I

*Instantaneous symmetrical RMS components of fault currents and voltages-to-ground at the fault and relations between them for various types of faults*

| | Three-phase fault phases A, B, and C | Line-to-line fault phases B and C | Line-to-ground fault phase A and ground | Double-line-to-ground fault phases B, C, and ground |
|---|---|---|---|---|
| $I_{A1} = I_1$ | $\frac{E}{Z_1}$ | $\frac{E}{Z_1 + Z_2}$ | $\frac{E}{Z_1 + Z_2 + Z_0}$ | $\frac{(Z_0 + Z_2)E}{Z_0 Z_1 + Z_1 Z_2 + Z_0 Z_2}$ |
| $I_{A2} = I_2$ | 0 | $-\frac{E}{Z_1 + Z_2}$ | $\frac{E}{Z_1 + Z_2 + Z_0}$ | $-\frac{Z_0 E}{Z_0 Z_1 + Z_1 Z_2 + Z_0 Z_2}$ |
| $I_{A0} = I_0$ | 0 | 0 | $\frac{E}{Z_1 + Z_2 + Z_0}$ | $-\frac{Z_2 E}{Z_0 Z_1 + Z_1 Z_2 + Z_0 Z_2}$ |
| $V_{A1} = V_1$ | 0 | $\frac{Z_2 E}{Z_1 + Z_2}$ | $\frac{(Z_0 + Z_2)E}{Z_1 + Z_2 + Z_0}$ | $\frac{Z_0 Z_2 E}{Z_0 Z_1 + Z_1 Z_2 + Z_0 Z_2}$ |
| $V_{A2} = V_2$ | 0 | $\frac{Z_2 E}{Z_1 + Z_2}$ | $-\frac{Z_2 E}{Z_1 + Z_2 + Z_0}$ | $\frac{Z_0 Z_2 E}{Z_0 Z_1 + Z_1 Z_2 + Z_0 Z_2}$ |
| $V_{A0} = V_0$ | 0 | 0 | $-\frac{Z_0 E}{Z_1 + Z_2 + Z_0}$ | $\frac{Z_0 Z_2 E}{Z_0 Z_1 + Z_1 Z_2 + Z_0 Z_2}$ |

Where E is the generated voltage or voltage at the fault before the fault occurred; $I_1$, $I_2$, and $I_0$ are the positive, negative, and zero-phase-sequence currents, respectively, at the fault with reference to phase A; $V_1$, $V_2$, and $V_0$ are the positive, negative, and zero-phase-sequence voltages at the fault with reference to phase A; and $Z_1$, $Z_2$, Since, in a transmission line, the positive-phase-sequence impedance is substantially equal to the negative-phase-sequence impedance, Table II can be considerably simplified if $Z_1 = Z_2$ and $Z_1' = Z_2'$. Accordingly, Table III is similar to Table II except for the substitution of $Z_1$ for $Z_2$ and $Z_1'$ for $Z_2'$.

TABLE III

*Instantaneous symmetrical RMS components of currents and voltages at a distance $Z_1'$ from the fault and the relations between them for various types of faults where $Z_1 = Z_2$ and $Z_1' = Z_2'$*

|  | Three-phase fault phases A, B, and C | Line-to-line fault phases B and C | Line-to-ground fault phase A and ground | Double-line-to-ground fault phases B, C, and ground |
|---|---|---|---|---|
| $I_1'$ | $\dfrac{C_1 E}{Z_1}$ | $\dfrac{C_1 E}{2 Z_1}$ | $\dfrac{C_1 E}{2 Z_1 + Z_0}$ | $\dfrac{C_1(Z_0 + Z_1) E}{Z_1(Z_1 + 2 Z_0)}$ |
| $I_2'$ | 0 | $-\dfrac{C_1 E}{2 Z_1}$ | $\dfrac{C_1 E}{2 Z_1 + Z_0}$ | $-\dfrac{C_1 Z_0 E}{Z_1(Z_1 + 2 Z_0)}$ |
| $I_0'$ | 0 | 0 | $\dfrac{C_0 E}{2 Z_1 + Z_0}$ | $-\dfrac{C_0 Z_1 E}{Z_1(Z_1 + 2 Z_0)}$ |
| $V_1'$ | $\dfrac{C_1 Z_1' E}{Z_1}$ | $\dfrac{(Z_1 + C_1 Z_1') E}{2 Z_1}$ | $\dfrac{(Z_0 + Z_1 + C_1 Z_1') E}{2 Z_1 + Z_0}$ | $\dfrac{Z_0 Z_1 + C_1 Z_1'(Z_0 + Z_1)}{Z_1(Z_1 + 2 Z_0)} E$ |
| $V_2'$ | 0 | $\dfrac{(Z_1 - C_1 Z_1') E}{2 Z_1}$ | $\dfrac{(Z_1 - C_1 Z_1') E}{2 Z_1 + Z_0}$ | $\dfrac{Z_0(Z_1 - C_1 Z_1') E}{Z_1(Z_1 + 2 Z_0)}$ |
| $V_0'$ | 0 | 0 | $\dfrac{(Z_0 - C_0 Z_0') E}{2 Z_1 + Z_0}$ | $\dfrac{Z_1(Z_0 - C_0 Z_0') E}{Z_1(Z_1 + 2 Z_0)}$ | and $Z_0$ are the positive, negative, and zero-phase-sequence impedances viewed from the fault.

In Table II, I have tabulated the positive, negative, and zero-phase-sequence currents and voltages at the relay, which is removed from the fault a distance which may be represented by the positive-phase-sequence impedance $Z_2'$ of the protected circuit between the relay and the fault.

TABLE II

*Instantaneous symmetrical RMS components of currents and voltages at a distance $Z_1'$ from the fault and the relations between them for various types of faults*

|  | Three-phase fault phases A, B, and C | Line-to-line fault phases B and C | Line-to-ground fault phase A and ground | Double-line-to-ground fault phases B, C, and ground |
|---|---|---|---|---|
| $I_1'$ | $\dfrac{C_1 E}{Z_1}$ | $\dfrac{C_1 E}{Z_1 + Z_2}$ | $\dfrac{C_1 E}{Z_1 + Z_2 + Z_0}$ | $\dfrac{C_1(Z_0 + Z_2) E}{Z_0 Z_1 + Z_1 Z_2 + Z_0 Z_2}$ |
| $I_2'$ | 0 | $-\dfrac{C_2 E}{Z_1 + Z_2}$ | $\dfrac{C_2 E}{Z_1 + Z_2 + Z_0}$ | $-\dfrac{C_2 Z_0 E}{Z_0 Z_1 + Z_1 Z_2 + Z_0 Z_2}$ |
| $I_0'$ | 0 | 0 | $\dfrac{C_0 E}{Z_1 + Z_2 + Z_0}$ | $-\dfrac{C_0 Z_2 E}{Z_0 Z_1 + Z_1 Z_2 + Z_0 Z_2}$ |
| $V_1'$ | $\dfrac{C_1 Z_1' E}{Z_1}$ | $\dfrac{(Z_2 + C_1 Z_1') E}{Z_1 + Z_2}$ | $\dfrac{(Z_0 + Z_2 + C_1 Z_1') E}{Z_1 + Z_2 + Z_0}$ | $\dfrac{Z_0 Z_2 + C_1 Z_1'(Z_0 + Z_2)}{Z_0 Z_1 + Z_1 Z_2 + Z_0 Z_2} E$ |
| $V_2'$ | 0 | $\dfrac{(Z_2 - C_2 Z_2') E}{Z_1 + Z_2}$ | $\dfrac{(Z_2 - C_2 Z_2') E}{Z_1 + Z_2 + Z_0}$ | $\dfrac{Z_0(Z_2 - C_2 Z_2') E}{Z_0 Z_1 + Z_1 Z_2 + Z_0 Z_2}$ |
| $V_0'$ | 0 | 0 | $\dfrac{(Z_0 - C_0 Z_0') E}{Z_1 + Z_2 + Z_0}$ | $\dfrac{Z_2(Z_0 - C_0 Z_0') E}{Z_0 Z_1 + Z_1 Z_2 + Z_0 Z_2}$ |

Where $Z_1'$, $Z_2'$, and $Z_0'$ are the positive, negative, and zero-phase-sequence impedances of the portion of the system between the fault and the distance relay for ohm unit, and $C_1$, $C_2$, and $C_0$ are respectively the ratios $$\frac{I_1'}{I_1}, \frac{I_2'}{I_2}, \text{ and } \frac{I_0'}{I_0}$$

If the positive, negative, and zero-phase-sequence quantities from Table III as substituted Equation 1 for the different types of faults, it may be shown that the polyphase relay having an operating and a restraining torque as referred to above will have the same reach for every type of fault, namely, the positive-phase-sequence reactance $X_1'$ between the relay and the fault. In Table IV, these substitutions are tabulated for the various types of faults but, to simplify the equations, I have omitted the expression "sin $\phi_1$, sin $\phi_2$, sin $\phi_0$" from Equation 1 since, as will be understood by those skilled in the art, this merely carries through to change the result to reactance instead of impedance, i. e., $Z_1' \sin \phi$ or $X_1'$ instead of $Z_1'$.

Table IV

*The substitution of the positive, negative, and Zero-phase-sequence quantities for the various types of faults into the following equation*

$$\frac{V_1'I_1' + V_2'I_2' + V_0'I_0'}{(I_1')^2 + (I_2')^2 + \frac{(I_0')^2 Z_0'}{Z_1'}}$$

| | |
|---|---|
| Three-phase fault | $\dfrac{C_1{}^2\left(\dfrac{Z_1'E^2}{Z_1{}^2}\right)}{C_1{}^2\left(\dfrac{E^2}{Z_1{}^2}\right)} = Z_1'$ |
| Line-to-line fault | $\dfrac{\left(\dfrac{C_1E}{2Z_1}\right)\left(\dfrac{Z_1+C_1Z_1'}{2Z_1}\right)E + \left(-\dfrac{C_1E}{2Z_1}\right)\left(\dfrac{Z_1-C_1Z_1'}{2Z_1}\right)E}{\left(\dfrac{C_1E}{2Z_1}\right)^2 + \left(-\dfrac{C_1E}{2Z_1}\right)^2} = Z_1'$ |
| Single line-to-ground fault | $Z_1'\left\{1 + \dfrac{Z_0(C_1-C_0)}{2C_1{}^2Z_1' + C_0{}^2Z_0'}\right\} = Z_1'$ when $C_1 = C_0$ |
| Double line-to-ground fault | $Z_1'\left\{1 + \dfrac{Z_1{}^2Z_0(C_1-C_0)}{C_1{}^2Z_1'(Z_0+Z_1)^2 + C_1{}^2Z_0{}^2Z_1' + C_0{}^2Z_1{}^2Z_0'}\right\} = Z_1'$ when $C_1 = C_0$ |

It will be observed from Table IV that, where $C_1 = C_0$, a relay having an operating torque proportional to $$(I_1')^2 + (I_2')^2 + \frac{(I_0')^2 Z_0'}{Z_1'}$$

and a restraining torque proportional to $$V_1'I_1' \sin \phi_1 + V_2'I_2' \sin \phi_2 + V_0'I_0' \sin \phi_0$$

will have the same distance response for every type of fault which might occur on a three-phase electric circuit. When the generating units and grounding units of this system are distributed in a predetermined manner then $C_1$ will substantially equal $C_0$. There are alternating current systems where $C_1$ will not substantially equal $C_0$ and in such a situation a distance relay at the generating end, when there is a preponderance of generating capacity at one end and a preponderance of grounding capacity at the other end, will not reach far enough under fault conditions involving ground, while the distance relay at the other end of the system will reach too far under similar faults involving ground. In such a case it may be necessary to use three single phase relays in order to get the proper distance response but in accordance with my invention, a polyphase distance responsive device having substantially the same reach for all types of faults is available for many applications.

Although it is possible by means of phase-sequence networks to isolate the positive, negative, and zero-phase-sequence currents and voltages required for the operating and restraining torques of the polyphase distance-responsive device expressed by Equation 1, such networks would greatly complicate the apparatus and considerably increase its cost. Furthermore, for many such applications, phase-sequence networks have been found to be more or less unsatisfactory. It can be shown, however, that both the numerator and the denominator of Equation 1 may be expressed in terms of the phase currents and voltages of a three-phase system. It will be understood by those skilled in the art that the power equations for a three-phase system in terms of phase currents and phase voltages may be expressed in terms of phase-sequence components. For example, the reactive power may be expressed as follows:

$$E_AI_A \sin \phi_A + E_BI_B \sin \phi_B + E_CI_C \sin \phi_C = \quad (2)$$
$$3(V_1'I_1' \sin \phi_1 + V_2'I_2' \sin \phi_2 + V_0'I_0' \sin \phi_0)$$

where $E_A$, $E_B$, and $E_C$ represent the magnitudes of the line-to-neutral voltages of phases A, B, and C, respectively, of the three-phase system and, correspondingly, $I_A$, $I_B$, and $I_C$ represent the magnitudes of the phase currents of this system. Also $\phi_A$, $\phi_B$, and $\phi_C$ represent the respective angles between the corresponding phase currents and voltages. Similarly, it can be shown that $$I_A{}^2 + I_B{}^2 + I_C{}^2 = 3\left[(I_1')^2 + (I_2')^2 + (I_0')^2\right] \quad (3)$$

Since I have shown that the operating torque of my polyphase distance-responsive device in order to have the same reach for all faults should be proportional to $$(I_1')^2 + (I_2')^2 + \frac{(I_0')^2 Z_0'}{Z_1'}$$

which may be expressed as $$(I_1')^2 + (I_2')^2 + (I_0')^2 + K(I_0')^2$$

where $$K + 1 = \frac{Z_0'}{Z_1'}$$

it will be observed from Equation 3 that $$I_A{}^2 + I_B{}^2 + I_C{}^2 + K_1I_R{}^2 = 3\left\{(I_1')^2 + (I_2')^2 + \frac{(I_0')^2 Z_0'}{Z_1'}\right\} \quad (4)$$

where $I_R$ is the residual current in the three-phase circuit. Consequently, if the single movable relay element has impressed thereon an operating torque proportional to $I_A{}^2 + I_B{}^2 + I_C{}^2 + K_1I_R{}^2$ and a restraining torque proportional to $E_AI_A \sin \phi_A + E_BI_B \sin \phi_B + E_CI_C \sin \phi_C$, it will comprise a polyphase distance relay of the reactance type which has the same reach or distance response for all types of faults which could occur on a three-phase circuit, such as a transmission line.

Referring now to Fig. 1, I have illustrated my invention as applied to a three-phase alternating-current system. As shown, the system comprises a three-phase bus 10 including the respective phase conductors 10A, 10B, 10C, connected through a suitable circuit-interrupting means, such as latched closed circuit breaker 12, to a three-phase transmission line or circuit to be protected 11 including the corresponding phase conductors 11A, 11B, and 11C. This circuit breaker is shown as provided with a trip coil 13 and an "a" auxiliary switch 14 which is closed when the circuit breaker is closed and open when the circuit breaker is open.

In order to isolate the polyphase circuit or transmission line 11 from the associated system, such as buses 10, upon the occurrence of a fault thereon, I have provided an electroresponsive device generally indicated at 15 and specifically illustrated as a polyphase ohm unit of the reactance type having a single movable element 16 controlling switch member 17 adapted to bridge contacts 18 connected in the circuit of trip coil 13. The circuit of trip coil 13 preferably includes contacts 19 adapted to be bridged by member 20 preferably controlled by a polyphase power directional unit, such as that disclosed and claimed in United States Letters Patent 2,110,673 referred to above, so that tripping of circuit breaker 12 will not occur by virtue of operation of electroresponsive device 15 unless the fault is on the protected section 11.

The structure of the electroresponsive device 15, which is schematically illustrated as a polyphase ohm unit of the reactance type in Fig. 1, and shown in greater detail in Fig. 2, comprises three hollow magnetic stators 21A, 21B, and 21C, respectively, each having two angularly displaced pairs of inwardly projecting salients $a_1$, $a_2$, $b_1$, and $b_2$. Centrally positioned relatively to and spaced from the ends of these salients is a magnetic member or stator 22 shown dotted in Fig. 1 since it is covered by a rotor 23 of electric current-conducting material which, in the form of a generally cylindrical cup as best shown in Fig. 2, is mounted to rotate in the gaps between the central stator 22 and the ends of the salients $a_1$, $a_2$, $b_1$, $b_2$. Each of the hollow magnetic stators 21A, 21B, and 21C is provided with such a rotor 23 which rotors are suitably interconnected so as to provide a single movable element 16 for controlling the bridging of contacts 18 by switch member 17.

In order to provide the voltage quantity for producing the desired restraining torque for the polyphase electroresponsive device 15, each of the salients $a_1$ of the hollow magnetic stators 21A, 21B, 21C is provided with a potential winding 24A, 24B, 24C, respectively, connected to be energized in accordance with the line-to-neutral voltages of phase conductors 11A, 11B, and 11C, respectively. To obtain these desired line-to-neutral voltages, I have provided a potential transformer 25 having a Y-connected primary winding 26 connected across the three-phase electric circuit 11 and a Y-connected secondary winding 27 having its neutral brought out so that line-to-neutral voltages for energizing windings 24A, 24B, and 24C, respectively, may be obtained therefrom across the taps of variable tap autotransformers 28A, 28B, and 28C, respectively. In order to provide the desired sine function of potential necessary for a reactance type of ohm unit, I connect in series with the potential windings 24A, 24B, and 24C a variable resistor 29 and a capacitor 30. These are so proportioned with respect to the inductance of the potential circuit as to have this circuit resonant at unity power factor in order to enable the unit to respond only to the reactive component of the ohmic measurement, and further to make the potential circuit dead beat so as to prevent incorrect operation in the event of sudden changes in the line voltage when a fault occurs and also to make the current in the potential circuit at a given voltage of such a value as to cause the unit to operate at a desired ohmic value. These three conditions can readily be fulfilled because there are three variables involved in three independent equations as disclosed in my prior United States Letters Patent 2,131,608, granted September 27, 1938, and assigned to the same assignee as the present application.

In order to provide the current quantity for producing a flux in the hollow magnetic stators 21A, 21B, and 21C, respectively, for reacting with the flux produced by the respective potential windings 24A, 24B, and 24C, I provide current windings 31 designated by the appropriate subscripts A, B, or C, depending upon the particular hollow magnetic stator 21A, 21B, or 21C, with which these windings are associated. These current windings 31 are wound on each side of salients $b_1$ and $b_2$ so that each hollow magnetic stator is provided with four windings in all, designated by the reference character 31, serially connected with one another. In order to energize these current windings 31, I have provided suitable current transformers associated with three-phase circuit 11 having secondary windings 32A, 32B, and 32C, respectively, connected in Y relationship with the neutral conductor 33 brought out so that the current windings 31A are connected across the secondary winding 32A, the current windings 31B are connected across the secondary winding 32B, and the current windings 31C are connected across the secondary winding 32C. With the arrangement described thus far, it will be observed that the flux produced in salients $b_1$ and $b_2$ interacts with the flux produced in the salient $a_1$ to produce a restraining torque on rotor 23 which is proportional to $E_A I_A \sin \phi_A$ with respect to stator 21 and $E_B I_B \sin \phi_B$ with respect to stator 21B and $E_C I_C \sin \phi_C$ with respect to stator 21C. Since these rotors 23 are all interconnected to form a single movable element 16, it will be obvious that the arrangement disclosed thus far will produce a restraining torque on movable element 16 proportional to $$E_A I_A \sin \phi_A + E_B I_B \sin \phi_B + E_C I_C \sin \phi_C$$

In order to produce the desired operating torque $I_A^2 + I_B^2 + I_C^2 + K_1 I_R^2$ on movable member 16, I provide on each of the salients $a_2$ windings 33 and 34, respectively, which, in Fig. 1, I have designated with the appropriate subscript, depending upon the particular hollow magnetic stator 21A, 21B, and 21C, with which these windings are associated. The winding 33A, for example, is connected in series with the windings 31A so that the flux produced in salient $a_2$ by virtue of winding 33A will interact with the fluxes in salients $b_1$ and $b_2$ to produce a torque on rotor 23 proportional to $I_A^2$. However, since the current in windings 31A and 33A are in phase, it is necessary in order to produce such a torque to provide a phase-shifting winding 35A on salient $a_2$ which has connected in circuit therewith a parallel arranged resistor 36 and capacitor 37. Similar phase-shifting windings 35B and 35C are provided on the salients $a_2$ of hollow magnetic stators 21B and 21C, respectively, so as to produce the $I_B^2$ and $I_C^2$ torque on movable member 16. The windings 34A, 34B, and 34C are serially connected with one another and energized with the residual current existing in the secondary windings 32A, 32B, and 32C of the current transformers associated with three-phase circuit 11. In order to provide the desired adjustment of this residual current, a suitable autotransformer 38 having adjustable tap 39 is provided. The flux produced by windings 34A, 34B, and 34C interacting with the fluxes existing in salients $b_1$ and $b_2$ of electroresponsive device 15 produces a torque on movable member 16 proportional to $K_1 I_R^2$. With the arrangement just described, the total flux produced in salients $a_2$ interacting with the total flux in salients $b_1$ and $b_2$ will produce an operating torque on movable element 16 proportional to $I_A^2 + I_B^2 + I_C^2 + K_1 I_R^2$.

It will be observed from Fig. 2 that the electroresponsive device 15 comprises a compact unit with the hollow magnetic stators 21A, 21B, and 21C mounted one above the other with the rotors 23 thereof interconnected to form a single movable element 16.

The operation of the protective system illustrated in Fig. 1 will be obvious to those skilled in the art. Whenever a fault occurs on transmission line 11 within the distance for which electroresponsive device or ohm unit 15 is set to reach, movable element 16 will be rotated so as to cause closing of contacts 18 and tripping of circuit breaker 12 regardless of the type of fault involved. Furthermore, the ohm unit will exhibit the same distance response or, in other words, have the same reach for all of the faults which might exist in those systems where $C_0=C_1$ as set forth above.

Although I have shown a particular form of the polyphase reactance relay in Fig. 1 which I at present consider the preferred embodiment of such an ohm unit having a single movable element which will provide the same distance response for all faults, in Fig. 3, I have disclosed a polyphase ohm unit, with the corresponding parts thereof designated by the same reference numerals as in Fig. 1, which comprises two disks 41 and 42, respectively, interconnected to form a single movable element 16 for controlling switch member 17. An operating torque for member 16 is provided by virtue of four shaded-pole electromagnets 43, 44, 45, and 46, respectively, associated with disk 41 whose windings are energized with currents $I_A$, $I_B$, $I_C$, and $K_1I_R$, respectively, thereby providing an operating torque on member 16 proportional to $I_A{}^2+I_B{}^2+I_C{}^2+K_1I_R{}^2$. A restraining torque may be applied to member 16 proportional to $$E_AI_A \sin \phi_A + E_BI_B \sin \phi_B + E_CI_C \sin \phi_C$$

by associating with disk 42 three wattmetric type motor elements 47, 48, and 49, respectively, having their windings energized with line-to-neutral potentials and line currents as indicated in Fig. 3. By providing for the potential circuit of each of the units a resistor 29 and condenser 30 similar to the arrangement disclosed in Fig. 1, each of the wattmetric elements will produce a torque proportional to the reactive volt amperes of the current and potentials with which they are energized. The operation of the arrangement disclosed in Fig. 3 will be obvious to those skilled in the art in view of the detailed discussion included above.

The electroresponsive device 15 of Fig. 1 need not be the induction cup type shown but may, therefore, also comprise the induction disk construction illustrated in Fig. 3. Furthermore, it will be understood by those skilled in the art that the induction dynamometer construction as disclosed and claimed in my prior United States Letters Patent 2,000,803, granted May 7, 1935, and assigned to the same assignee as the present application, may also be employed in the arrangement disclosed in Fig. 1 by interconnecting three movable dynamometer elements to a single shaft to produce the single movable element 16 of Figs. 1 and 3. It will also be understood by those skilled in the art that, instead of having opposed windings on the relay, suitable transformers may be used and the resulting mixed current may be supplied to the relay windings.

On those systems where $C_0$ does not equal $C_1$, namely where there is an unequal distribution of the generating and grounding units, separate relays may be provided for phase faults and for ground faults. In Fig. 4, I have schematically illustrated a protective system employing an electroresponsive device 50 having a single movable element 16 for protecting against all faults involving more than one line or phase and giving substantially the same distance response for all of these faults. The corresponding parts of the protective system of Fig. 4 are designated by the same reference numerals as in Fig. 1. Since this polyphase ohm unit 50 is to be responsive only to faults involving more than one phase, it is possible to use only two hollow magnetic stators, designated at 21$_{AB}$ and 21$_{BC}$, respectively, in Fig. 4 in view of the energization of the potential windings 24$_{AB}$ and 24$_{BC}$ thereof with line-to-line potentials, instead of three as in Fig. 1. This arrangement of two units for protecting against phase faults in a three-phase system is based on the same principle as the well-known two wattmeter method of measuring three-phase power.

In order that electroresponsive device 50 has the same reach for all line-to-line faults regardless of which phases are involved, it is necessary to eliminate the effect of the zero-phase-sequence components of current and voltage which may be accomplished in several ways, one of which is to provide traps or filters for preventing these components from affecting the relay. However, I prefer to energize the electroresponsive unit so that the restraining torque involves delta voltages, which automatically eliminate the zero-phase-sequence component thereof, and phase currents from which the zero-phase-sequence component has been subtracted.

By using the values of the phase-sequence components of current and voltage from Table III, it can be shown that, if the single movable element 16 of electroresponsive device 50 has applied thereto an operating torque proportional to $$(I_1')^2+(I_2')^2$$

and a restraining torque proportional to $$V_1'I_1' \sin \phi_1 + V_2'I_2' \sin \phi_2$$

then the ratio of the latter to the former is equal to $Z_1' \sin \phi$ or $X_1'$ for three-phase and phase-to-phase faults and $$\frac{V_1'I_1' \sin \phi_1 + V_2'I_2' \sin \phi_2}{(I_1')^2+(I_2')^2} = \left\{Z_1' + \frac{Z_0Z_1{}^2}{C_1\{(Z_0+Z_1)^2+Z_0{}^2\}}\right\}\sin \phi \quad (5)$$

for double line-to-ground faults. Equation 5 shows that the relay will not reach out quite so far in distance on a double line-to-ground fault as on a three-phase and line-to-line faults. This is of no consequence, however, because, in this arrangement, the double line-to-ground faults would be taken care of by the ground relays protecting against single line-to-ground faults. In the case where the ground current is too small to operate a ground relay, $Z_0$ is very high so that the expression $$\frac{Z_0Z_1{}^2}{C_1\{(Z_0+Z_1)^2+Z_0{}^2\}}$$

in Equation 5 is substantially zero and the right-hand side of Equation 5 becomes $Z_1' \sin \phi$ or $X_1'$, which is the same as for three-phase and line-to-line faults.

Although it is possible by means of phase-sequence networks to isolate the positive and negative-phase-sequence currents and voltages required to satisfy the left-hand side of Equation 5, as was mentioned above, such networks would not be satisfactory in many instances. However, I have found it unnecessary to use the phase-sequence components directly since it can be shown that the two relationships expressed by Equations 6 and 7 below enable the substitution of line-to-line voltages and phase and residual currents for the phase-sequence voltages and currents expressed by the left-hand side of Equation 5.

$$\frac{E_{BC}}{3}\left(I_C-\frac{I_R}{3}\right)-\frac{E_{AB}}{3}\left(I_A-\frac{I_R}{3}\right)=V_1'I_1'+V_2'I_2' \quad (6)$$

$$\frac{1}{3}\left\{(I_A-I_B)\left(I_A-\frac{I_R}{3}\right)-(I_B-I_C)\left(I_C-\frac{I_R}{3}\right)\right\}= (I_1')^2+(I_2')^2 \quad (7)$$

In order that the restraining torque expressed by Equation 6 may be applied to the movable member 16 of electroresponsive device 50, the salient $a_1$ of hollow magnetic stator 21AB is energized with the potential $E_{AB}$ and the salient $a_1$ of hollow magnetic stator 21BC is energized with the potential $E_{BC}$ obtained across suitable potential transformers 25AB and 25BC, respectively. The salients $b_1$ and $b_2$ of hollow magnetic stator 21AB are provided with a flux proportional to $$I_A - \frac{I_R}{3}$$

by providing the current windings 31A, which windings are energized with the phase current $I_A$, on each side of the salients $b_1$ and $b_2$ and the residual current windings 51 which have one-third as many turns as windings 31A. In the same manner, hollow magnetic stator 21BC is provided with current windings 31c and residual current windings 51 having one-third as many turns as windings 31c. It will be understood by those skilled in the art that windings 31 and 51 might have the same number of turns but, in such a case, an autotransformer similar to 38 in Fig. 1 would be necessary to give the necessary 3 to 1 relationship. To produce the operating torque expressed by Equation 7, the flux in salients $b_1$ and $b_2$ interacts with the flux in salients $a_2$ which, in the case of the hollow magnetic stator 21AB, is provided with windings 33A and 52B, the former having the current $I_A$ flowing therethrough while the latter has the current $I_B$ flowing therethrough, so arranged that the fluxes oppose each other. Hollow magnetic stator 21BC, on the other hand, has the windings 33c and 52B wound in opposed relationship on salient $a_2$ and energized respectively with the currents $I_C$ and $I_B$ so as to produce a flux proportional to $I_B - I_C$.

From the above discussion, it will be observed that electroresponsive device 50 will give exactly the same distance response for three-phase faults and line-to-line faults regardless of the conductors involved in the latter type of fault. Furthermore, in those situations where the zero-phase-sequence impedance $Z_0$ of the system viewed from the fault is very high, electroresponsive device 50 will have the same reach for double line-to-ground faults as for three-phase and line-to-line faults.

It may be found that, with certain values of line constants, the difference between the distance measurement on line-to-line faults and double line-to-ground faults may be less if the residual current windings 51 of Fig. 4 were eliminated. However, if this is done, the distance measurement may be slightly different on line-to-line faults depending upon which conductors are involved in the fault. I have found that the most reliable arrangement is that shown in Fig. 4 including the residual current windings 51.

The operation of the protective system illustrated in Fig. 4 will be obvious to those skilled in the art in view of the detailed description included above.

While I have illustrated and described certain particular embodiments of my invention, it will be understood that modifications thereof will occur to those skilled in the art. I desire it to be understood, therefore, that my invention is not limited to the particular arrangements disclosed and I tend in the appended claims to cover all modifications and changes which fall within the true spirit and scope of my invention.

What I claim as new and desire to secure by Letters Patent of the United States is:

1. In a polyphase distance-responsive relay for protecting a polyphase alternating-current circuit comprising a plurality of magnetic structures and only a single movable element associated with said magnetic structures for operating a control circuit, means for applying torques to said movable element including current and potential windings on said structures, means for energizing said windings from said polyphase alternating-current circuit so that said distance-responsive relay has the same reach for all types of faults which might occur on said circuit regardless of the number of phases involved or whether the fault involves ground.

2. In combination with an alternating-current electric circuit, circuit-interrupting means for controlling said circuit, an electroresponsive device having a single movable element for controlling said circuit-interrupting means, and means for energizing said electroresponsive device from said circuit so that an operating torque proportional to $$(I_1')^2 + (I_2')^2 + \frac{(I_0')^2 Z_0'}{Z_1'}$$

and a restraining torque proportional to $$V_1'I_1' \sin \phi_1 + V_2'I_2' \sin \phi_2 + V_0'I_0' \sin \phi_0$$

are applied to said single movable element where $V_1'$, etc., $I_1'$, etc., and $Z_1'$, etc., are the phase-sequence components of voltage, current, and impedance of said circuit, respectively.

3. In an electroresponsive device for an electric circuit, a rotatable member, and means for exerting thereon a torque substantially proportional to $(I_1')^2 + (I_2')^2$ and an opposing torque substantially proportional to $V_1'I_1' + V_2'I_2'$ where $E_1'$, $I_2'$, $V_1'$, and $V_2'$ are the respective positive and negative-phase-sequence components of current and voltage of said circuit.

4. In an electroresponsive device for an electric circuit, a rotatable member, and means for exerting thereon a torque substantially proportional to the sum of the squares of the phase-sequence currents of said circuit and an opposing torque substantially proportional to the sum of the reactive phase-sequence components of power.

5. In an electroresponsive device for an electric circuit, a single movable member including a plurality of current-conducting members associated therewith, and means for exerting a resultant torque on said member in response to a fault on said electric circuit which is substantially proportional to the difference between the sum of the squares of a plurality of phase-sequence currents of said circuit and the sum of a plurality of the phase-sequence components of reactive power of said circuit.

6. In combination with a polyphase alternating-current electric circuit, circuit-interrupting means for controlling said circuit, a polyphase electroresponsive device having a plurality of magnetic structures and a single rotatable element comprising a plurality of current-conducting members attached to a common shaft each associated with one of said magnetic structures for controlling said circuit-interrupting means, and means for energizing said electroresponsive device from said polyphase alternating-current circuit so that said electroresponsive device operates similarly for all types of faults which might occur on said circuit.

7. In combination with a polyphase alternating-current electric circuit, circuit-interrupting means for controlling said circuit, a polyphase distance-responsive device having a single rotatable element comprising a plurality of current-conducting members attached to a common shaft for controlling said circuit-interrupting means, and means for energizing said distance-responsive device from said polyphase alternating-current circuit so that said distance-responsive device has the same reach for all types of faults which might occur on said circuit.

8. In a distance-responsive relay for protecting a polyphase alternating-current circuit, a single rotatable element comprising a plurality of current-conducting members attached to a common shaft, a plurality of current and potential windings associated with said relay, and means for energizing said windings from said polyphase alternating-current circuit so that said relay has the same distance response for all types of faults which might occur on said circuit whether or not involving ground and regardless of the number of conductors involved.

9. In combination with a polyphase alternating-current electric circuit, circuit-interrupting means for controlling said circuit, a polyphase distance-responsive device having a single rotatable element comprising a plurality of current-conducting members attached to a common shaft for controlling said circuit-interrupting means, a magnetic stator including a current and a potential winding associated with each of said current-conducting members for exerting a torque on said rotatable element proportional to an impedance characteristic of said circuit between said distance-responsive device and a fault occurring on said circuit, and means for energizing said current and potential windings from said alternating-current circuit so that said distance-responsive device has the same reach for all types of faults which might occur on said circuit whether or not involving ground.

10. In combination with a polyphase alternating-current electric circuit, circuit-interrupting means for controlling said circuit, a polyphase distance-responsive device having a single rotatable element comprising a plurality of current-conducting members attached to a common shaft for controlling said circuit-interrupting means, a plurality of hollow magnetic stators axially arranged with respect to one another and each including a current and a potential winding, each of said current-conducting members being associated with one of said stators for torque-producing purposes so that the resultant torque exerted on said rotatable element is proportional to an impedance characteristic of said circuit between said distance-responsive device and a fault occurring on said circuit, and means for energizing said current and potential windings from said alternating-current circuit so that said distance-responsive device has the same reach for all types of faults which might occur on said circuit whether or not involving ground.

11. In combination with a polyphase alternating-current electric circuit, circuit-interrupting means for controlling said circuit, a polyphase distance-responsive relay having a single rotatable element for controlling said circuit-interrupting means, a plurality of current and potential windings associated with said relay, means for energizing said potential windings from said polyphase alternating-current circuit, means for energizing certain of said current windings in accordance with the respective phase currents flowing in said polyphase circuit, and means for energizing certain other of said current windings with the residual current flowing in said circuit so as to produce a torque on said rotatable element which is proportional to the distance between the relay and the fault occurring on said circuit regardless of the type of fault involved.

12. In a distance-responsive relay for protecting a polyphase alternating-current circuit, a single rotatable element, means for producing a torque on said single rotatable element comprising a plurality of current and potential windings, means for energizing said potential windings from said polyphase alternating-current circuit, means for energizing certain of said current windings in accordance with the respective phase currents flowing in said polyphase circuit, and means for energizing certain other of said current windings with the residual current flowing in said circuit, said residual current windings having less ampere turns than said phase current windings.

13. In an electroresponsive device for an electric circuit, a rotatable member, and means for exerting thereon a torque substantially proportional to the sum of the squares of the phase-sequence currents of said circuit and an opposing torque substantially proportional to the sum of a predetermined function of the volt-ampere phase-sequence components of said circuit.

14. In a polyphase electroresponsive device of the impedance type for protecting an alternating-current circuit, a plurality of magnetic structures, a single movable member associated with said structures for operating a control circuit, a plurality of torque-producing elements associated with said member including a plurality of windings, and means for energizing said windings in dependence upon predetermined phase sequence quantities of said alternating current circuit so that said electroresponsive device has the same reach for all faults occurring on said alternating-current circuit involving more than one conductor.

15. In combination with a polyphase alternating current electric circuit, circuit-interrupting means for controlling said circuit, a polyphase electroresponsive device of the distance type having a plurality of magnetic structures and a single movable element associated therewith for controlling said circuit interrupting means, a plurality of torque producing members associated with said element including current and potential windings, and means for energizing said windings in dependence upon a predetermined relationship between the phase-sequence components of current and potential of said alternating-current circuit so that said polyphase electro-responsive device has the same distance response for all faults involving more than one conductor which might occur on said polyphase alternating-current circuit.

16. In a protective system for a polyphase alternating-current circuit, a single electroresponsive device of the distance type including a plurality of magnetic structures and a single movable element associated therewith for controlling the operation of a control circuit, and means for controlling the operation of said single electroresponsive device in dependence upon predetermined phase-sequence quantities of said alternating current circuit so that said electroresponsive device has the same reach for all faults occurring on said polyphase alternating current circuit involving more than one conductor.

17. In a polyphase distance-responsive relay for protecting a polyphase alternating-current circuit in which the generating units and grounding units of the system are distributed in a predetermined manner comprising a plurality of magnetic structures and only a single movable element associated with said magnetic structures for operating a control circuit, means for applying force to said single movable element including current and potential windings on said magnetic structures, means for energizing said windings from said polyphase alternating-current circuit so that said distance-responsive relay has the same reach for all types of faults which might occur on said circuit regardless of the number of phases involved or whether the fault involves ground.

ALBERT R. van C. WARRINGTON.

CERTIFICATE OF CORRECTION.

Patent No. 2,345,440. March 28, 1944.

ALBERT R. van C. WARRINGTON.

It is hereby certified that error appears in the printed specification of the above numbered patent requiring correction as follows: Page 3, first column, line 40, for " $Z_2'$ " read -- $Z_1'$ --; line 67, Table II, fourth column thereof, strike out the equation sign and insert instead a minus sign; and second column, line 35, for "as substituted" read -- are substituted in --; page 7, second column, line 40, for " $E_1'$ " read -- $I_1'$ --; and that the said Letters Patent should be read with this correction therein that the same may conform to the record of the case in the Patent Office.

Signed and sealed this 23rd day of May, A. D. 1944.

Leslie Frazer

(Seal) Acting Commissioner of Patents.